INVENTOR.
JACK W. SAMPSELL
BY
ATTORNEYS

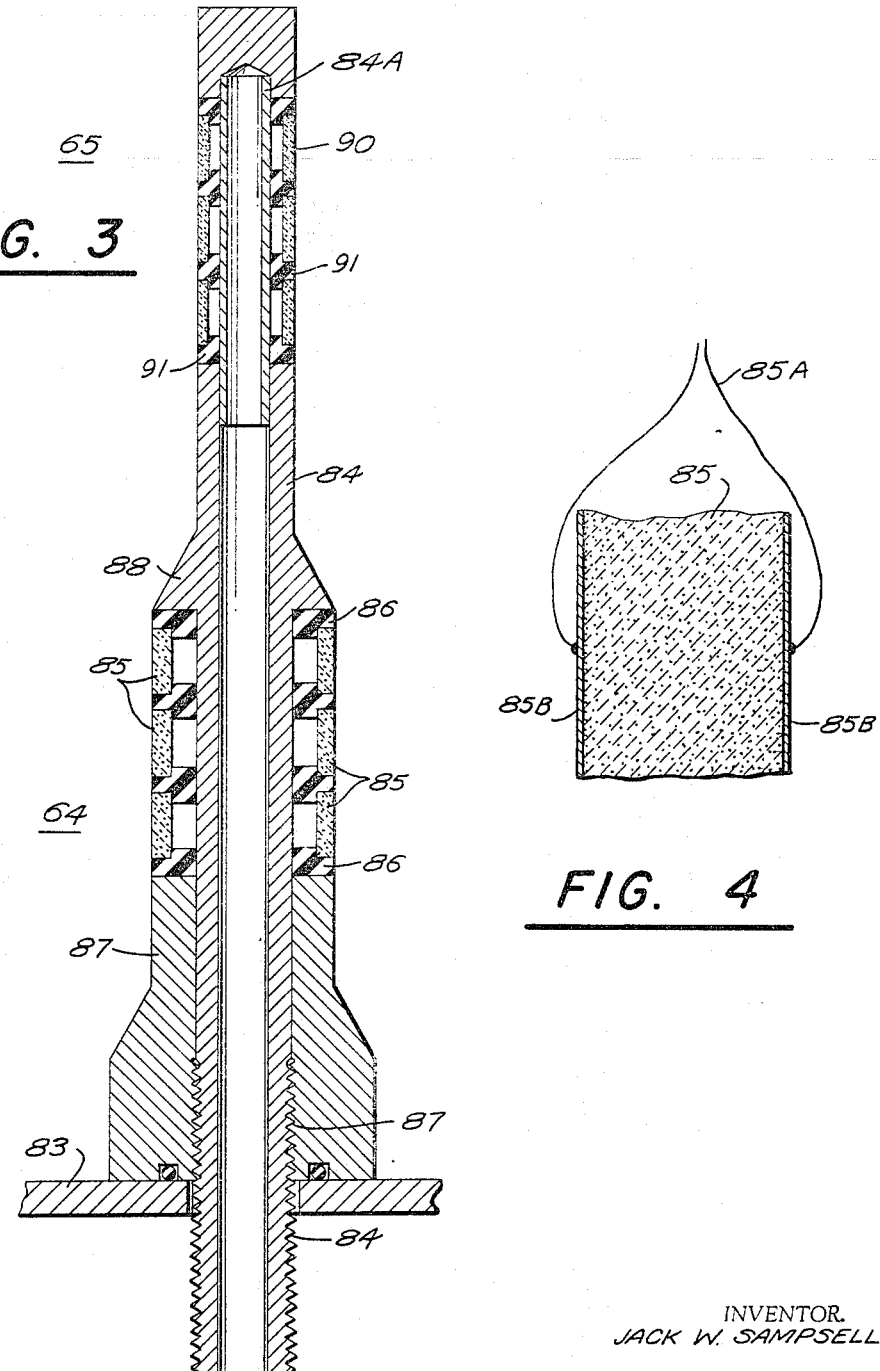

ns to the United States Patent Office
3,277,428
Patented Oct. 4, 1966

3,277,428
TRANSDUCER ARRAY FOR UNDERWATER TRANSPONDER
Jack W. Sampsell, National City, Calif., assignor to the United States of America as represented by the Secretary of the Navy
Filed Feb. 20, 1964, Ser. No. 347,074
1 Claim. (Cl. 340—2)

The invention described herein may be manufactured and used by or for the Government of the United States of America for governmental purposes without the payment of any royalties thereon or therefor.

This invention relates to underwater transponders for sonar systems and is particularly directed to the structural features of the transmit-receive transducer array.

The transponder contemplated here comprises means for repeating an underwater acoustic signal by receiving, amplifying and re-transmitting the signal. The transponder is capable of repeating a continuous high frequency wave, as distinguished from a pulsed high frequency wave. It will be perceived that where a continuous-wave transmitter is operated near a continuous-wave receiver, the problem is ever present of preventing damaging regeneration and ringing in the repeater.

An object of this invention is to provide an improved transponder.

A more specific object of this invention is to provide a transponder with a transducer arrangement for acoustically isolating the transmit-transducer from the receive-transducer.

Other objects and features of this invention will become apparent to those skilled in the art by referring to the specific embodiment described in the following specification and shown in the accompanying drawing in which:

FIG. 3 is a detailed sectional view of the transducer array for the transmitting and receiving channels of the transponder of FIG. 2; and FIG. 4 is a perspective view of one transducer element of the type employed in the array of FIG. 3.

Figure 1:
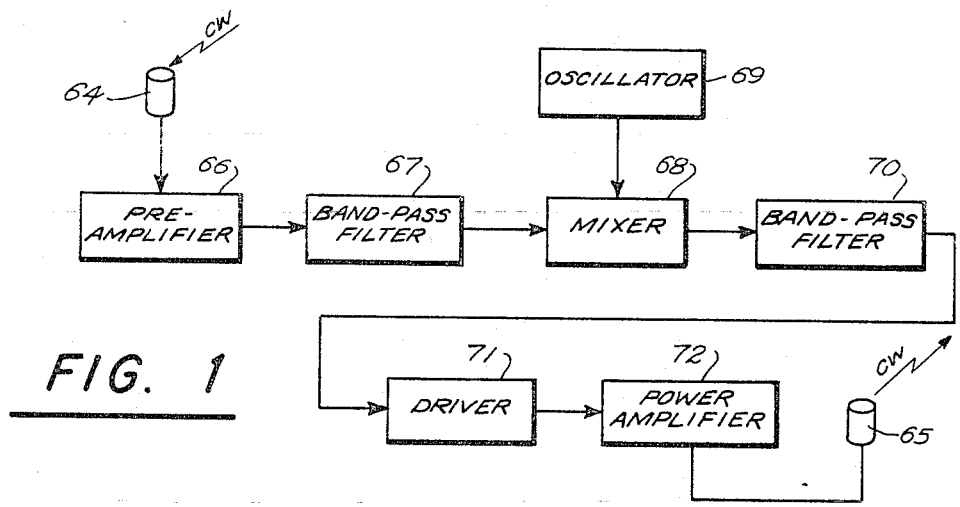
FIG. 1 is a block diagram of the electrical circuits of one transponder embodying this invention.

In FIG. 1 is shown the general layout of one transponder in which the transducer structure of this invention is adapted for use. A continuous wave is received at the hydrophone or receiving transducer 64 and is retransmitted from transducer 65 for amplification and, preferably, after frequency change in the mixer 68. That is, except for the frequency change, the signals received and transmitted are identical. After preliminary amplification at 66 the received wave is selected by the bandpass filter 67 and applied to one of the two inputs of the mixer 68. To the other input is applied a locally generated frequency from oscillator 69 to obtain mixer products including upper and lower sidebands. One of the sidebands, preferably the upper sideband, is selected by the bandpass filter 70 and after amplification at 71 is applied to the power amplifier 72 and hence to the transmitting transducer 65.

Figure 2:
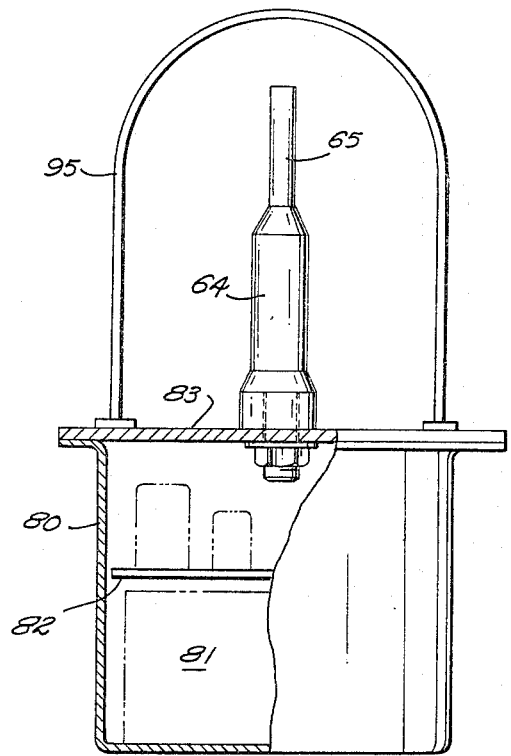
FIG. 2 is an elevational view partly in section of the mechanical arrangement of one transponder embodying this invention.

In FIG. 2 is seen the physical embodiment of one transponder according to this invention. The transponder is self contained and is intended for underwater use as a beacon. The equipment must be sealed in a container such as the drawn steel housing 80. Batteries 81 are arranged in the bottom of the container beneath the insulating platform 82 upon which is mounted the electronic elements 66 to 72 of FIG. 1. The upper end of the container is closed by the sealed lid 83. Extending upwardly from the center of the lid are the transducer arrays 64 and 65 connected, respectively, to the receiving and transmitting sections of the circuits. Batteries 81 being relatively heavy will, conveniently, shift the center of gravity of the assembly so as to permit the assembly of FIG. 2 to stand upright on the ocean bottom. The roll bar 95 is attached to the upper lid and is curved upwardly and around the transducer elements to protect the relatively fragile elements from damage by unfriendly drag chains or lines.

In operation, a sonic interrogating wave is received by the receiving transducer 64 and is amplified, filtered, shifted in frequency and applied to the transmitting transducer array 65. Because of the close proximity of the receiving and transmitting arrays a small amount of acoustic signal fed directly between the two arrays can cause serious feedback and ringing.

The transducer array shown in detail in FIG. 3 has been found to effectively isolate the receiving and transmitting transducers.

The supporting post 84 is preferably hollow and is threaded at the lower end for watertight attachment over a central opening in the lid 83. The transducer elements of the receiving array are short cylinder or rings 85 disposed end to end coaxially over the center post. The rings 85 are relatively large in diameter compared with the post 84 and are supported upon rubber-like rings 86 to space the rings from each other and from the supporting post. The rubber rings and transducer rings are telescoped over the supporting post and are squeezed lengthwise by the screw threaded adjustment of the collars 87 and 88. It appears now that the transducer elements 85 are firmly, yet resiliently supported and are mechanically isolated from the supporting post except through the relatively soft rubber rings 86.

The transducer elements 90 of the transmitting array 65 are likewise short cylindrical sections or rings disposed coaxially over the post extension 84A. The transducer rings are spaced from each other and from the post by rubber-like rings 91.

In the specific embodiment of FIG. 3, the transmitting frequency is assumed to be higher than the receiving frequency so that the transducer period of vibration of the transmitting rings must be higher than the vibration period of the receiving rings. Accordingly, the dimensions and inside diameter of the transmitting elements are smaller than the receiving elements. In this context, the supporting post is conveniently stepped down in size as by the short section of pipe 84A brazed into the upper end of the post 84.

One transducer element, shown in greater detail in FIG. 4, comprise an annulus of ceramic of piezoelectric material such as barium titanite. Deposited, as by vacuum evaporation, on the inner and outer surfaces of the cylinder are metal electrodes 85B. By soldered connections the inner and outer electrodes are connected to the lead wires 85A. When a frequency near the natural frequency of the ring is applied to leads 85A, the radial dimension of the cylinder changes at the applied frequency. The radial movement of the annulus imparts radially expanding acoustic waves to the water environment. Likewise when received acoustic energy impinges upon the outer surface of the ring, the ring is displaced radially and a voltage is coupled to the leads 85A.

Conveniently the leads 85A are threaded through holes in the supporting post and hence downwardly through the post to the interior of the container 80 where appropiate connections are made to the transmitting and receiving terminals of the repeater equipment.

Many modifications may be made in the structural details of this invention without departing from the scope of the invention as defined in the appended claim.

What is claimed is:

A unitary transponder assembly comprising a watertight container, a lid sealed watertight to one end of said container,
- a transducer array extending centrally outward from said lid,
- said array comprising a supporting post,
- a first group of ceramic rings of piezoelectric material disposed end-to-end along said post adjacent one end of said post,
- a second group of ceramic rings of piezoelectric material disposed end-to-end along said post adjacent the opposite end of said post,
- lead-in conductors threaded centrally through said post between the terminals of the groups of rings and the transmitting and receiving equipment of said transponder in said container,
- a roll bar rigidly attached to said lid and substantially encircling said transducer array, and
- said equipment being so arranged in said container that the center of gravity of the assembly is displaced away from said lid and opposite said array so that the array and container will stand stably upward.

References Cited by the Examiner

UNITED STATES PATENTS

| | | | |
|---|---|---|---|
| 2,418,846 | 4/1947 | Meacham | 340—2 |
| 2,732,536 | 1/1956 | Miller | 340—8 |
| 2,868,311 | 1/1959 | Tullos. | |
| 3,051,927 | 8/1962 | Mazzagatti | 340—10 X |
| 3,171,094 | 2/1965 | Geren et al. | 340—2 |

CHESTER L. JUSTUS, *Primary Examiner.*

R. A. FARLEY, *Assistant Examiner.*